Dec. 21, 1965
A. GEY ETAL
3,225,200
DETERMINATION OF THE NUMBER OF NEUTRONS
EMITTED SIMULTANEOUSLY BY A SOURCE
Filed Aug. 8, 1962
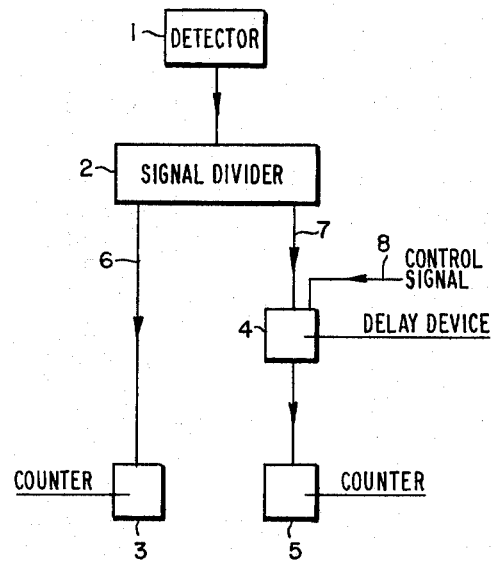
INVENTORS
ALBERT GEY
JACQUES JACQUESSON
BY Bacon & Thomas
ATTORNEYS

United States Patent Office 3,225,200
Patented Dec. 21, 1965

3,225,200
DETERMINATION OF THE NUMBER OF NEUTRONS EMITTED SIMULTANEOUSLY BY A SOURCE
Albert Gey, Sceaux, and Jacques Jacquesson, Fresnes, France, assignors to Commissariat a l'Energie Atomique, Paris, France
Filed Aug. 8, 1962, Ser. No. 215,662
Claims priority, application France, Aug. 11, 1961, 870,965
4 Claims. (Cl. 250—83.1)

This invention relates to a process for evaluating the proportion of neutrons emitted simultaneously from a radio-active sample. The neutrons considered as being simultaneously emitted are, for example, those emitted upon fission which are in number greater than one. Other neutrons may appear at different times, for instance those due to reactions $(\alpha, n)$ engendered by $\alpha$ particles released contingently.

The process according to the invention for determining, among the neutrons emitted by a source, the proportion of neutrons emitted simultaneously, comprises the steps of providing a detector means adapted to deliver a signal upon detection of a neutron, the time interval between the appearance of said neutron and the emission of said signal being less than a predetermined time delay, and comparing the indications of two counters receiving the signal issued from the detecting device, one through a first line having a dead time that is negligible with respect to said predetermined time delay and the other by means of a second line having a dead time substantially equal to said time delay.

The invention also relates to a device for carrying out the said process.

The invention will now be described with reference to the drawing which shows, by way of example, an arrangement for carrying out the invention.

The description refers to a particular example wherein the source of neutrons consists in a mixture of plutonium $_{94}Pu^{239}$ and of plutonium $_{94}Pu^{240}$. Such a mixture produces neutrons from spontaneous fission and if it contains slight impurities (Be, B, F, C, etc.), it also produces neutrons by reaction of the type $(\alpha, n)$. The determination of the respective quantity of these two types of neutrons is of great interest. It enables the harmonising of the effort of chemical purification aimed at eliminating slight impurities which are objectionable from a nuclear point of view with the known effort to obtain plutonium slightly enriched in isotope 240 by means of short irradiation cycles. By A is designated the number of neutrons issued per second by the reactions $(\alpha, n)$ self-sustaining in the sample. For the sample, F designates the number of spontaneous fissions per second and $\bar{\nu}$ the average number of neutrons produced by one fission; the number of neutrons of fission produced each second is then $\bar{\nu}F$ (in the case of the spontaneous fission of $_{94}Pu^{239}$, $\bar{\nu}$ is of the order of 2.3).

Supposing that the neutrons are detected after thermalisation for example by means of one or more counters filled with boron trifluoride suspended in paraffin. Under these conditions, two simultaneously emitted neutrons are detected at spaced intervals in an interval of time T immediately following the appearance of the neutrons in the free state. The interval T corresponds to the maximum value of the sum of the times of slowing down, of diffusion and of capture by the detector. By maximum value one fixes, for example, the practical limit corresponding to four or five times the period determined by the exponential curve giving the probability of survival of a free neutron. For an experimental detecting device T is of the order of 500 μs.

In a simplified hypothesis, consider the ideal of a very efficient detection assembly (the efficiency coefficient of the detection $\epsilon$ being near 100%). In effecting a count by means of an electronic device sufficiently rapid that the dead time is only several microseconds one obtains a number of counts per second:

$$N_1 = A + \bar{\nu}F \qquad (1)$$

In effecting a second count with an electronic device introducing a dead time $\theta$, of the same order of size as T and preferably equal to this interval corresponding to the total duration of slowing down and of detection, it is only possible to count a single signal per fission. Under these conditions, the number of signals registered per second is:

$$N_2 = A + F \qquad (2)$$

From Equations 1 and 2 one may deduce without difficulty the numbers A and F.

$$F = \frac{N_1 - N_2}{\bar{\nu} - 1}$$

In the case where the coefficient of efficiency of the detector is much lower than 1, the first count with a dead time $\theta$ very small compared with the total duration of detection gives a result:

$$N_1' = \epsilon(A + \bar{\nu}F) \qquad (3)$$

For the second count, executed by means of an electronic chain introducing a dead time greater than the maximum duration of detection under the particular conditions, it is necessary to take into account a supplementary loss due to the coincidences which may be produced between the neutrons of fission. In fact, instead of detecting an average $\bar{\nu}$ neutrons of fission, one detects $\bar{\nu}-\beta$; there is an apparent decrease of the number $\bar{\nu}$ and the result of the count on the line having appreciable dead time is:

$$N_2' = [A + (\bar{\nu}-\beta)F]\epsilon \qquad (4)$$

the quantity $\beta$ is calculable as a function of the efficiency $\epsilon$ of the counter used and of the probabilities $Q_i$ of obtaining $i$ neutrons upon a spontaneous fission:

$$\beta = (Q_2 + 3Q_3 + 6Q_4 + 10Q_5)\epsilon - (Q_3 + 4Q_4 + 10Q_5)\epsilon^2$$

It is often necessary to take into account the loss due to the existence of a dead time on the line having appreciable dead time. The evaluation of this loss permits determination of a more probable value of $N_2'$ from a result of a count $N_2''$.

The numbers A and F are easily deduced from relations 3 and 4 when $N_1'$ and $N_2'$ have been determined.

In general, the difference $N_1' - N_2'$ is small; for accuracy it is advantageous to simultaneously effect the corresponding count on the line having appreciable dead time and the corresponding count on the line having negligible dead time when carrying out the process.

The introduction of a dead time of relative importance on the second line results, as has been indicated, in a need for examination of the calculable value of the corresponding error introduced. The curve giving the correction for dead time can also be established experimentally by subtraction of the results of count on the two lines of the device of the invention when it is subjected to a source $(\alpha, n)$ only. One can also arrange for this correction to be small, for example by limiting the weight of the sample.

On the figure of the drawing there is shown schematically a device according to the invention. Reference numeral 1 indicates the detector comprising six proportional counters containing boron trifluoride completely immersed in paraffin. This detector is subjected to irradiation by a sample of plutonium. The signal divider 2 receives the signals from detector 1 and simultaneously delivers those signals to two counting lines 6 and 7. The first line 6 introduces a negligible dead time $\theta_1$, for example $10^{-5}$ seconds, inherent in the electronic chain utilised, and its counter 3 delivers an indication $N_1'$. The second line 7 comprises a delay device 4 which introduces a dead time $\theta_2$, for example of the order of $10^{-3}$ seconds, and is inserted between 2 and a counter 5, providing an indication $N_2''$. The device 4 may consist in a monostable multivibrator having an adjustable time constant. The time constant may be controlled by a control signal delivered to the device 4 through conductor 8.

For a quality of plutonium which has been controlled and a sample weighing 10 grams, the correction due to the dead time on the line 7, having appreciable dead time is less than a thousandth. An accuracy of the order of 5% on the product $\bar{\nu}F$ necessitates, under the indicated conditions, that counting be effected for about 1 hour.

The selection of relatively small samples obviates the necessity of taking into account the coefficient of multiplication whose influence would not be negligible for large samples.

It is evident that the invention is limited neither to the study of sources formed by samples of a mixture of plutonium $_{94}Pu^{239}$ and of plutonium $_{94}Pu^{240}$, nor to the devices for determining the relative grades in isotopes of samples of plutonium; it may be used on the contrary for studying all sources emitting free neutrons appearing simultaneously and free neutrons emitted individually. It is applicable in particular to the determination of the effective cross-sections $(n, 2n)$ $(n, 3n)$ etc. of other materials than fissile materials.

What we claim is:

1. Apparatus for determining, from the neutrons emitted by a source thereof, the proportion of those neutrons emitted simultaneously, comprising: detector means for detecting an emitted neutron and generating a signal pulse upon such detection; means arranged to receive said pulses and simultaneously direct the same to first and second counting lines; said first counting line including a pulse counter and being free of signal delaying means; said second counting line including a pulse counter and time delay means for delaying delivery of a pulse to its counter, said time delay means being arranged to delay a pulse for a predetermined time interval of the same order of magnitude as the time between emission of a neutron by said source and generation of a signal pulse upon detection thereof by said detector means.

2. Apparatus as defined in claim 1 wherein said time delay means is arranged to delay a pulse for a time interval at least equal to the time between emission of a neutron by said source and generation of a signal pulse upon detection thereof by said detector means.

3. Apparatus as defined in claim 1 wherein said detector means includes moderator means for slowing the passage of neutrons therethrough.

4. Apparatus as defined in claim 1 wherein said time delay means comprises a multivibrator having means for adjusting the time constant thereof.

References Cited by the Examiner

High Resolution Neutron Velocity Spectrometer With Betatron Source, by Yeater et al., from The Review of Scientific-Instruments, vol. 28, No. 7, July 1957, pages 514–524.

Measuring the Prompt Period of a Reactor, by Brunson et al., from Nucleonics, vol. 15, No. 11, November 1957, pages 132, 133, 134, 136, 138, 140, 141.

RALPH G. NILSON, *Primary Examiner.*

ARCHIE R. BORCHELT, *Examiner.*